Figure 5:
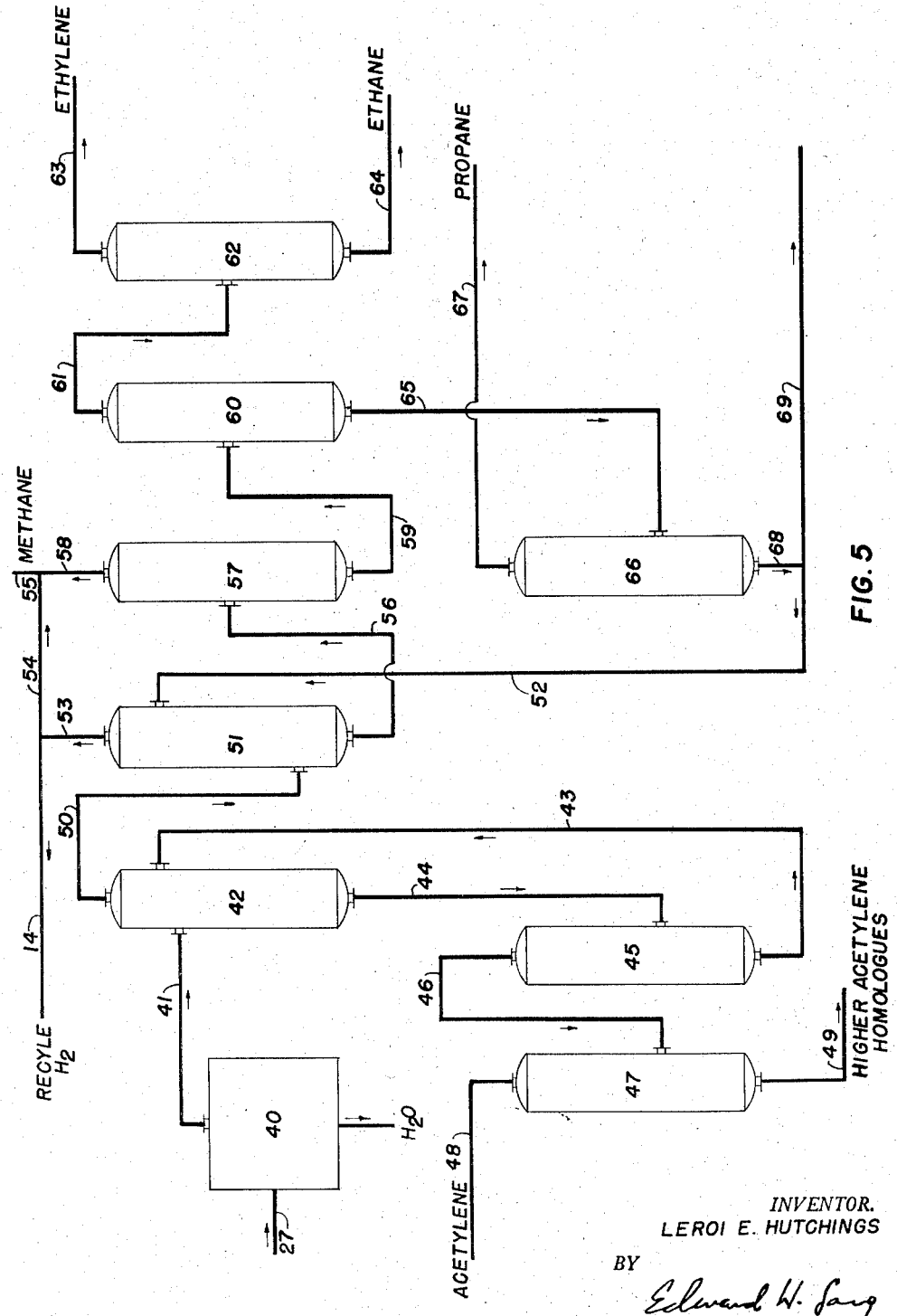

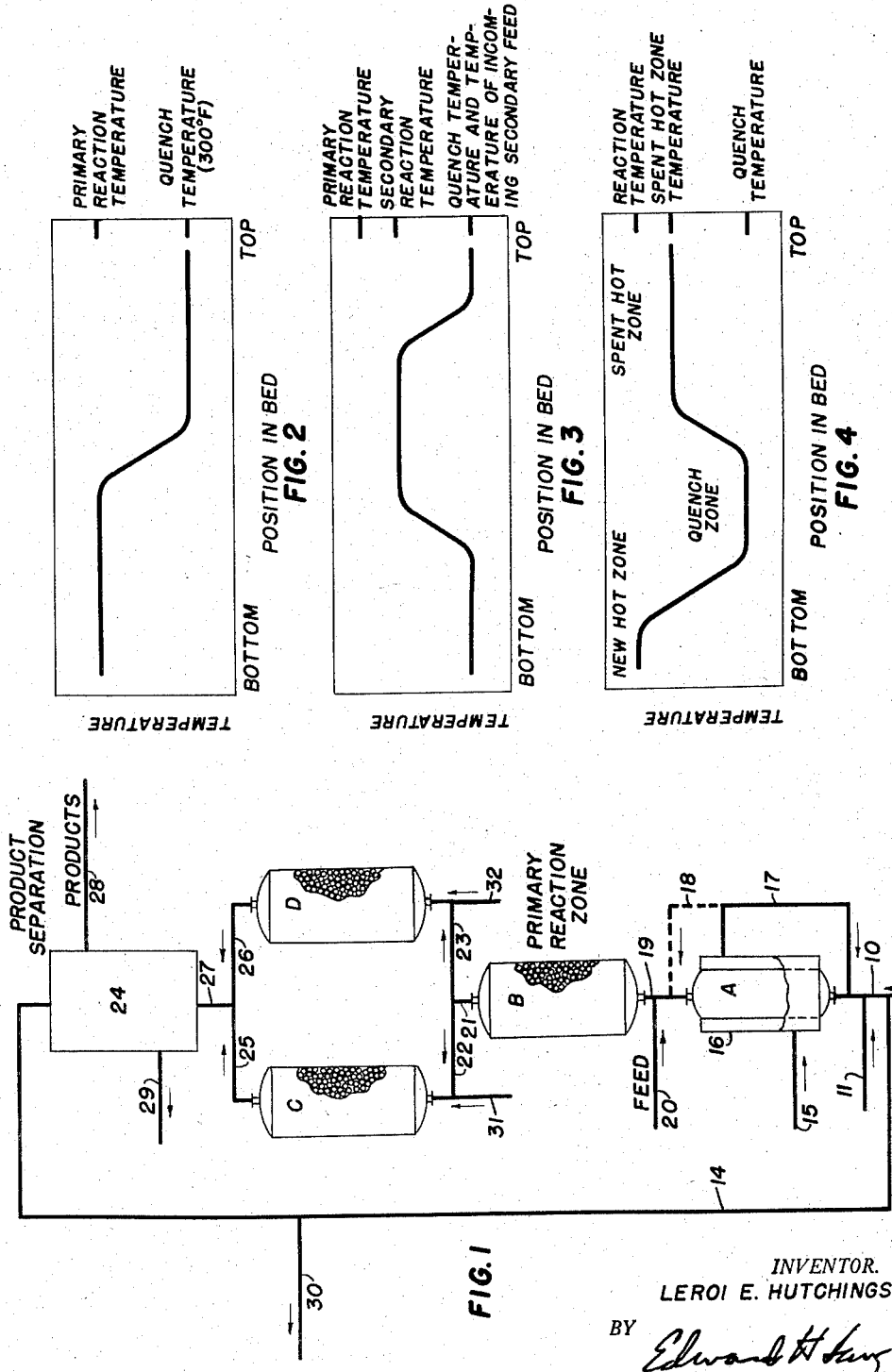

INVENTOR.
LEROI E. HUTCHINGS
BY
ATTORNEY

United States Patent Office 2,878,262
Patented Mar. 17, 1959

2,878,262

HYDROCARBON PYROLYSIS PROCESS

Le Roi E. Hutchings, Crystal Lake, Ill., assignor to The Pure Oil Company, Chicago, Ill., a corporation of Ohio Application October 18, 1956, Serial No. 616,669

9 Claims. (Cl. 260—679)

This invention relates to the pyrolytic processing of low boiling, hydrocarbon feed stocks to produce gaseous hydrocarbons of low molecular weight. It is more specially concerned with the high temperature, thermal decomposition of selected feed stocks, especially $C_2$-$C_6$ hydrocarbons, to produce olefinic hydrocarbons.

Among the most widely used feed stocks for numerous chemical manufacturing processing are the unsaturated hydrocarbons, such as ethylene, propylene, acetylene and others. These unsaturated hydrocarbons can be prepared from a variety of petroleum products such as liquefied petroleum gases, natural gases, waste refinery gases, butanes, light and heavy naphthas, and distillate stocks of higher boiling range, such as gas oils and the like. Although normally gaseous hydrocarbons are generally preferred over heavier, normally liquid hydrocarbon fractions for pyrolytic treatment, the selection in general depends upon the availability of suitable feed stocks. Although the normally liquid hydrocarbons can be catalytically decomposed to produce unsaturated, normally gaseous hydrocarbons, this type of processing is generally not effective in the treatment of normally gaseous feed stocks for the production of unsaturated hydrocarbons because higher temperatures and relatively short exposure times are required. In processing these feed stocks, it is difficult to maintain catalyst activity and selectivity at high conversions where various equilibria result in a plurality of secondary products. Accordingly, more flexible operations within the bounds of practicality and economy can be obtained by utilizing strictly pyrolytic methods in the processing of selected or prepared feed stocks in the production of normally gaseous unsaturated hydrocarbons.

Accordingly, it is a primary object of this invention to provide a process for the efficient production of normally gaseous, unsaturated hydrocarbons by the non-catalytic, high-temperature treatment of selected feed stocks. It is another object of this invention to effect efficiencies in heat recovery in the operation of strictly pyrolytic processes for the production of normally gaseous, unsaturated hydrocarbons. These and other objects will become more apparent from the following detailed description of the invention.

Figure 1 shows a flow diagram of one embodiment of the process employed in the pyrolytic treatment of hydrocarbon feed stocks to produce normally gaseous, unsaturated hydrocarbons according to this invention.

Figures 2, 3, and 4 graphically illustrate temperature profiles which occur in the quenching zones employed to rapidly decrease the reaction effluent below conversion level.

Figure 5 schematically illustrates a product separation system which can be employed to provide the recycle hydrogen used in carrying out the process of this invention.

In prior art processes, the reactants employed in high temperature conversion processes have been heated to the required temperature level and the heat for reaction has been supplied by a variety of pyrolytic techniques. According to this invention, steam from the reaction between substantially stoichiometric amounts of hydrogen and oxygen, preferably with an excess of hydrogen, is produced at sufficiently high temperatures to be employed as a source of heat for the conversion of hydrocarbon feed stocks. The hydrocarbon feed stock, which has been heated to a temperature somewhat below the range of rapid decomposition, is admixed with the high temperature steam to bring about the desired conversion, employing very brief reaction times. The rapid quenching of the reaction effluent is effected by passing it through a mass of relatively cool, heat-absorbing, granular particles of a refractory solid material, and is carried out with attendant efficient heat exchange and recovery. The refractory mass in the quenching zone, upon being heated to a high temperature by direct contact with the reaction effluent, is subsequently employed in the regenerative, refractory, thermal processing of a separate stream of hydrocarbon feed stock which is introduced directly into the heated quenching zone to produce unsaturated gaseous hydrocarbons. By employing the integrated process of this invention, the economical pyrolytic production of unsaturated gaseous hydrocarbons can be carried out with facility.

Because the process of this invention can be carried out employing conventional process equipment, the manipulative operation is schematically illustrated by means of a flow diagram in which auxiliary equipment, such as pumps, valves, et cetera is omitted. With reference to Figure 1, it is seen that hydrogen introduced through line 10 mixes with oxygen introduced through line 11, the oxygen preferably being substantially pure. When starting up the process, a gas to be used as a source of heat is prepared by introducing hydrogen or hydrocarbon fuel gases through line 13. These gases are admixed with oxygen in line 10 to provide the combustible mixture. Once the process is on stream, however, hydrogen is produced as a by-product of the gas conversion process. In this instance, hydrogen is separated from condensible reaction products, and is transferred to line 10 by means of line 14. The combustible mixture produced in line 10 burns in combustion zone A. Since the oxygen-hydrogen flame is very hot, the skin of the combustion zone is maintained relatively cool by introducing cooling water, low-pressure steam, or feedstock at line 15 by means of which it is introduced into cooling jacket 16 surrounding the combustion zone. If water or steam is used as the coolant, it leaves jacket 16 through line 17 and enters line 10 where it mixes with the burning hydrogen for further temperature control. However, if feed is used as the coolant, it leaves jacket 16 via line 18 and mixes with the hot combustion gases in line 19 for conversion. Primary feed enters line 19 by means of line 20.

The mixture of feed gases and hot combustion gases, at a temperature of about 2500–3000° F., enters reaction zone B wherein pyrolysis occurs. This zone may be a void space, but is preferably a bed of solid, refractory, heat-exchange pellets which induce intimate mixing and reduce back-mixing and residence time.

Pyrolytic conversion of the hydrocarbon feed stock carried out in this manner produces a high yield of olefins without any significant tar or coke formation. By employing steam in a dual capacity as a source of heat for the conversion and as a diluent for lowering the partial pressure, conditions conducive to undesirable side reactions and coke formation are avoided and practical yields of unsaturated hydrocarbons are obtained.

The hot products and combustion gases (which comprise water and hydrogen) leave reaction zone B via line 21 which branches into lines 22 and 23. These lines connect reaction zone B with quenching zones C and D, respectively. Quenching zones C and D comprise separate vessels, each containing a mass of a refractory, heat-transfer material which, when functioning as a quenching zone, is at a temperature sufficiently low to stop the reaction, e. g., about 300° F. These parallel zones serve alternately as the quenching area. When employed as a quenching zone, a hot zone develops in the vessel and gradually increases in size until a substantial portion of the refractory mass is at about the reaction temperature which exists in reaction zone B. The temperature of the secondary reaction zone will be about 50–150° F. lower than the temperature in the primary reaction zone due to heat losses that occur before the heated portion of the bed is employed as a reaction section. The quenching cycle is arranged so that there is retained in the quenching zone a cool zone of sufficient extent to effect satisfactory cooling of the reaction effluent. When this situation has been attained, the flow of reaction effluent is switched as hereinafter described. The products, which have been cooled to a temperature of about 300° F., pass from the particular quench zone in service and mix with hot gases from the other zone. The resulting admixture, which is at a temperature of about 600° to 800° F., is sent to product separation means 24 through lines 25 or 26 and line 27.

In product separator 24, the products are further cooled by direct or indirect heat exchange, as with a spray of water or a temperature-stable solvent, such as benzene. Solvents of this type may be desirable to selectively absorb one or more components from the total product gas stream. Products are separated from hydrogen made in the process and withdrawn through line 28. Water formed in the combustion zone is discharged through line 29. A portion of the recovered hydrogen is recycled to the combustion zone via line 14, and the remainder is removed through line 30.

While quench zone D is on stream, zone C, which has been heated by reaction products during a previous period, is in use as a secondary reactor. The heat stored in this zone during the previous quench step is used to pyrolyze a secondary hydrocarbon feed entering at a temperature of about 300° F. through line 31. The pressure on this stream is adjusted to prevent the flow of hot reactants from reaction zone B to secondary reaction zone C through line 22. In practice, a minor portion of this secondary feed flows through line 22 to join line 23, but the major part enters zone C. The secondary feed, upon entering zone C, becomes heated to about the temperature of the zone and pyrolyzes. The pyrolysis reactions are endothermic and further cool the bed, so that it reaches the temperature of the incoming secondary feed, i. e., 300° F., and becomes ready for another quenching cycle. Pyrolyzed products from zone C flow through line 25 to join major product stream 26, by which they are quenched, and the combined products then flow to product recovery system 24. When zone D has become hot from quenching the products from reaction zone B, entry of secondary feed is switched to line 32 and zone C is changed from reaction to quench service; conversely, zone D is switched from quench to reaction service. It is noteworthy that special valves resistant to high temperatures are not required for switching this flow.

The following specific examples illustrate this invention:

*Example I*

One hundred and fifty pound-moles of product hydrogen and 75 pound-moles of substantially pure oxygen per hour are charged to a burning section having a cross-sectional area of 3 sq. ft. This section consists of a steel vessel lined with firebrick, the vessel being jacketed to provide an annular space through which cooling water may be introducerd to prevent the destruction of the steel by the high temperatures. The hydrogen is burned therein and hot combustion gases (steam) are produced. Combustion zone A is maintained at a temperature of 3000° F. by introducing low-pressure steam at the rate of 90 pound-moles per hour through line 15 into heat-exchange jacket 16. This steam leaves jacket 16 at a temperature of 1000° F. via line 17 and mixes with incoming oxygen and hydrogen to regulate the temperature of the combustion products so that a temperature of 2500° F. results when they mix with 100 pound-moles of ethane entering through line 20. The ethane in the hot reaction mixture undergoes pyrolysis in reaction zone B, which comprises a pebble bed contained in a steel tank, the internal walls of which are suitably lined with insulating bricks. The internal diameter of this zone is 1 ft. and the length is 4 ft. After pyrolysis, the products are quenched to 300° F. in zone D. The quenching zone comprises a similar bed, 3 ft. in diameter and 15 ft. long.

Total time at temperatures at which extensive reactions may take place is about 0.10 second, average. Supplemental ethane is introduced at line 31 in an amount approximately equal to that of ethane entering at line 20, viz., 100 pound-moles per hour. At the end of the cycle (1 hour) this feed is switched to line 32. The ethane is pyrolyzed in zone C which, previously having been employed in quench service, is partially at a temperature of 2500° F. The remainder of zone C, which was not heated during its quenching cycle, acts as a quenching zone for this material. The two resulting product streams combine in line 27, and hydrogen and water are separated in product recovery means 24 comprising a vessel 2 ft. in diameter and 10 ft. long in which a spray of water flows down against the rising stream of gases. One thousand gallons of water per hour, at a temperature of 90° F., are passed through the spray nozzle. Uncondensed products pass overhead to a conventional recovery system. The liquid hydrocarbons are separated from the water, and the water is cooled and recirculated. While the types and quantities of products will vary during the cycles of the process, the averages will be as follows:

| | Moles/100 moles of charge |
|---|---|
| $H_2$ | 150 |
| $CH_4$ | 33 |
| $C_2H_2$ | 26 |
| $C_2H_4$ | 48 |
| $C_2H_6$ | -- |
| $C_6H_6$ | 3 |
| Higher boiling hydrocarbons | 1 |

*Example II*

Employing the same apparatus as utilized in Example I, 150 pound-moles of produced hydrogen, 33 pound-moles of produced methane, and 141 pound-moles of oxygen are burned in combustion zone A, the temperature being regulated with water as in Example I. One hundred pound-moles of primary feed (ethane) and 100 pound-moles of secondary feed (ethane) are used as above, and essentially the same products are obtained. In this example, some methane is burned because the product hydrogen is not purified to the extent reached in Example I. Therefore, some carbon dioxide and/or monoxide will be formed in the combustion step, but this is removed dissolved in the water which is condensed and used as cooling spray in the cooling step.

In carrying out the process of this invention, the combustion of oxygen, employing either recycle hydrogen produced during the processing step or hydrogen from a separate source or a hydrocarbon fuel gas, can be carried out in conventional combustion equipment.

Although the use of substantially pure oxygen is preferred in the combustion step in order to avoid unnecessarily complicating product purification, air may also be used. If pure oxygen is obtained from air, the by-product nitrogen may be used to react with excess hydrogen produced in the pyrolysis reactions to make other valuable products such as ammonia, hydrogen cyanide, et cetera. The amount of excess hydrogen produced is dependent upon heat balances, charge stocks, reaction severity, and other process variables, and will limit the amount of nitrogen that may be included in the oxygen stream in the combustion zone, if it is expeditious to do so. Substantially stoichiometric amounts of hydrogen and oxygen, or an excess of hydrogen, are employed in order to provide complete combustion and avoid the presence of oxygen in the combustion gases. Because excess hydrogen is produced, it is desirable to provide a stoichiometric excess of hydrogen for admixture with the oxygen. In general, a mole ratio of hydrogen:oxygen of between about 2–4 to 1 should be employed.

In starting up the process when no recycle hydrogen is available for combustion, a gaseous hydrocarbon fuel such as ethane or propane can be substituted until the process is on stream.

Combustion gases issuing from the burner may be at a temperature in excess of 3500° F. Such an excessively high temperature is undesirable for carrying out the pyrolytic conversion of the hydrocarbon feed stock because complete decomposition of the hydrocarbon to carbon and hydrogen can be prevented only by employing extremely short contact times. Accordingly, the combustion gases are preferably cooled to the desired temperature level by dilution with steam just prior to burning the hydrogen and oxygen. Excess hydrogen may be used for this purpose, also. Sufficient amounts of the coolant must be employed to limit the combustion gases to about 3000° F. before they combine with the fresh feed.

The feed stock, which is introduced into the hot combustion gases issuing from the burner system, can be any selected or prepared hydrocarbon feed stock which is receptive to thermal decomposition to produce unsaturated, gaseous hydrocarbons. Because the use of high temperature steam as a heat carrier suppresses coke formation to an insignificant level, a wide range of feedstocks is possible. Accordingly, gaseous feed stocks including waste refinery gases, liquefied petroleum gases, natural gas, $C_2$–$C_4$ saturated hydrocarbons or mixtures thereof, or low-boiling, normally liquid hydrocarbon fractions, such as pentanes, hexanes, etc., may be used. The feed stock is introduced into the reaction zone at a rate sufficient to provide a contact time of .001 to .1 second at cracking temperatures of 2000 to 3000° F. Although the steam/hydrocarbon feed mol ratio will depend upon the desired reaction temperature, generally a ratio of 2 to 10 mols of steam per mol of hydrocarbon feed will produce desired results. The reaction zone is of conventional design and can be in the form of a simple transfer line wherein the pyrolytic decomposition takes place adiabatically, or in a more elaborate reaction vessel. Suitable reactors include refractory-lined vessels containing a refractory mass which induces intimate mixing of the steam heat-carrier with the feed stock and reduces back-mixing and residence time.

The reaction effluent passes from the reaction zone to a suitable quench zone which, in accordance with this invention, also functions as a heat reservoir. The quench zone preferably is a vessel of requisite diameter containing a heat-absorbing refractory mass. When functioning as a quenching zone, the refractory mass initially is at a temperature sufficiently low to permit the quenching of the reaction effluent, e. g., about 300° F. The reaction effluent, upon being quenched, loses its heat to the heat-transfer mass which becomes heated to an elevated temperature sufficient to induce thermal decomposition. The quenching zone is utilized in such a manner that a cool zone is always maintained in supra position to the secondary reaction zone to function as a quench zone. When the temperature sufficient to induce thermal decomposition is reached in a sufficiently long section of the quench zone, the flow of the reaction effluent is transferred to a second quench zone connected in parallel with the first quench zone. As hereinbefore pointed out, the first quench zone, which has been heated to a temperature level sufficient to induce pyrolytic decomposition, is then employed as a regenerative refractory system to effect hydrocarbon pyrolysis. The processing of the secondary feed stock is carried out under substantially the same operating conditions as employed in the primary reaction zone, except that heat is supplied by the heated refractory mass instead of a steam heat-carrier. Accordingly, temperatures of 2000°–2900° F., and contact times of 0.001–0.1 second are employed. Preferably, the process is carried out at about atmospheric pressure, although other pressures can be employed. It is during this step that the temperature of the bed is again reduced to a suitable quench temperature, e. g., 300° F., by maintaining the temperature of the secondary feed at that temperature by adequate heat exchange.

Each of the quench zones, or, preferably, secondary reaction vessels, contains several zones at different temperature levels. At the close of a period of quenching service, the temperature profile in the pebble bed is as shown in Figure 2. Thereafter, the vessel is switched to reaction service. Secondary feed is then admitted, and after a time the temperature profile shown in Figure 3 exists. Entry of secondary feed is stopped before the quench zone at the top of the secondary reactor has been completely displaced from the bed, and the vessel is switched to quench service. Midway in the quench period, the temperature profile is as shown in Figure 4. At this time, the gases leaving the vessel are hot, having been reheated by the residual hot zone to a temperature below that required to induce pyrolysis. The hot effluent is partially cooled by mixing with quenched effluent from the alternate vessel, which is on reaction service and has a profile similar to that shown in Figure 3. Final cooling of the combined stream is accomplished by the water or solvent spray, or by indirect heat exchange as previously discussed.

When the residual, or spent hot zone has been entirely displaced, a temperature profile similar to that shown in Figure 2 again exists, and the vessel is again ready for a period of secondary reaction service.

The same feed stock employed in the primary reaction system can be utilized, or a different type of feed stock of the same general nature as the primary feed can be processed in the secondary reaction system. It will be noted that this apparatus has a dual function, serving to quench the reaction effluent emanating from the primary reaction zone and functioning as a fixed-bed, regenerative refractory system for the pyrolytic decomposition of $C_2$–$C_6$ hydrocarbon feed stocks. The construction of such vessels is well known to the art. The effluent passing from the final quench zone is transferred to a product separation zone. There are available a wide choice of methods for separating the cooled reaction effluent into specification products. An illustrative system for the separation of reaction effluent is shown in Figure 5.

In accordance with this illustrative example of a product recovery system, the reactor effluent, after being quenched in the manner hereinbefore described, is sent to a settler 40 in which the water is separated from the non-condensible constituents, and passes through line 41 into absorber 42 where the gases are contacted with a selective solvent, such as acetone, entering through line 43, which selectively absorbs the acetylene and higher homologues from the product stream.

The fat solvent passes through line 44 into fractionator 45 where the solvent is regenerated and returned to absorber 42 via line 43. The acetylenes released in fractionator 44 pass through line 46 into fractionator 47 where acetylene is removed as an overhead product through line 48, and the higher acetylene homologues are removed through line 49.

The overhead product from absorber 42 passes via line 50 into a second absorber 51, where incoming lean absorbent oil enters through line 52 to absorb most of the hydrocarbons. The hydrogen resulting from the pyrolysis of hydrocarbons in the reaction section, and some methane, pass overhead from absorber 51 into line 53 from which a portion is returned to the reaction section by line 14, and the balance goes to plant fuel or other uses via lines 54 and 55. The fat oil from absorber 51 passes through line 56 to demethanizer 57 where methane is rejected as an overhead stream. The remaining hydrocarbons pass through line 59 to deethanizer 60 where an overhead stream of ethylene and ethane passes through line 61 into fractionator 62 for separation into ethylene, which leaves by line 63, and ethane, which leaves by line 64 for recycle to the reaction section.

The hydrocarbons remaining in the liquid in deethanizer 60 pass through line 65 into depropanizer 66 where an overhead stream of propane is taken to storage, or to another process, via line 67. The hydrocarbons heavier than propane are lead through lines 68 and 69, with a portion being withdrawn through line 52 for use as absorption oil in tower 51.

The above description represents one method for obtaining the hydrogen for recycle to the reaction vessel section. A number of other modifications or alternate schemes are possible. Thus, for example, when the hydrocarbon feed is relatively pure ethane, and reaction conditions are such as to give virtually complete conversion of the ethane, ethane-ethylene fractionator 52 may be omitted, since the overhead product from deethanizer 60 would be ethylene of sufficient purity for many uses.

As another modification, if the reaction conditions are such as to give only a minor amount of acetylene, acetylene absorber 42 and fractionators 45 and 47 may be omitted, and instead, the acetylene content of the products may be controlled by means of a conventional acetylene hydrogenation unit which then treats all of the gases passing through line 41.

In general, the cooled reaction effluent is settled to separate the water and hydrocarbon constituents. The gaseous product from the settler is then sent to the compression system and/or absorption system. In this section, conventional techniques like those described above are employed to separate the gaseous constituents to provide the desired gaseous products in substantially pure form, as well as recycle hydrogen.

Accordingly, it is seen that the subject process provides a flexible pyrolytic process for the decomposition of hydrocarbon feed stocks to normally gaseous, unsaturated hydrocarbons. Important features of this invention are high heat utilization, simple product purification, absence of requirements for external heat supply or fuel, and process design which avoids the use of special valves for high temperature applications.

Accordingly, I claim as my invention:

1. In the non-catalytic high temperature continuous gas pyrolysis of $C_2$–$C_6$ saturated hydrocarbons to produce unsaturated hydrocarbons and hydrogen, a reaction cycle which comprises continuously burning recycled hydrogen with oxygen to provide an oxygen-free flue gas consisting essentially of superheated steam, continuously mixing a $C_2$–$C_6$ hydrocarbon feed stock with said steam in a reaction zone to produce a pyrolysis effluent containing unsaturated hydrocarbons and hydrogen, passing said pyrolysis effluent into a first quenching chamber packed with a relatively cool mass of granular refractory heat transfer material, the rate of flow of reactants and rate of cooling in said quench chamber being such that the hydrocarbons are maintained at pyrolysis temperature for only a fraction of a second, terminating the flow of pyrolysis effluent through said quench chamber when the interface between hot and cool portions of the refractory packing has reached a point where the remaining cool portion of the packing is at about minimum efficiency for quenching the pyrolysis effluent, transferring the flow of pyrolysis effluent through a second quench chamber packed with a relatively cool mass of granular refractory heat transfer material to quench said effluent at the same rate as in said first chamber, and simultaneously therewith passing a cool secondary $C_2$–$C_6$ hydrocarbon feed stock through said first quench chamber to pyrolyze the same to produce a secondary pyrolysis effluent containing unsaturated hydrocarbons and cool the heated portion of said first quench chamber packing, rapidly cooling said secondary pyrolysis effluent below pyrolysis temperature, mixing the effluents from said quench chambers, separating the mixed effluents into a hydrogen fraction, a mixed hydrocarbon fraction, and a water fraction, and recycling the hydrogen fraction to the hydrogen combustion step, continuing to pass primary pyrolysis effluent into said second quench chamber and secondary hydrocarbon feed into said first quench chamber until the interface between heated and cool portions of refractory packing in said second quench chamber reaches a point where the cool portion of packing is at about minimum efficiency for quenching pyrolysis effluent and the hot portion is at substantially the temperature of the primary pyrolysis effluent, and the heated portion of said first quench chamber packing has been cooled to substantially the temperature of the secondary hydrocarbon feed, and then transferring flow of primary pyrolysis effluent to said first quench chamber for continuing rapid quenching and flow of said secondary hydrocarbon feed to said second quench chamber for continuing pyrolysis.

2. In the non-catalytic high temperature continuous gas pyrolysis of $C_2$–$C_6$ saturated hydrocarbons to produce unsaturated hydrocarbons and hydrogen, a reaction cycle which comprises continuously burning recycled hydrogen with oxygen to provide an oxygen-free flue gas consisting essentially of superheated steam, tempering said steam to a temperature of about 2500°–3000° F., continuously mixing a $C_2$–$C_6$ hydrocarbon feed stock with said steam in a reaction zone at a temperature of about 2000°–3000° F. to produce a pyrolysis effluent containing unsaturated hydrocarbons and hydrogen, passing said pyrolysis effluent into a first quenching chamber packed with a relatively cool mass of granular refractory heat transfer material, the rate of flow of reactants and rate of cooling in said quench chamber being such that the hydrocarbons are maintained at pyrolysis temperature for about 0.001–0.1 second, terminating the flow of pyrolysis effluent through said quench chamber when the interface between hot and cool portions of the refractory packing has reached a point where the remaining cool portion of the packing is at about minimum efficiency for quenching the pyrolysis effluent, transferring the flow of pyrolysis effluent through a second quench chamber packed with a relatively cool mass of granular refractory heat transfer material to quench said effluent at the same rate as in said first chamber, and simultaneously therewith passing a cool secondary $C_2$–$C_6$ hydrocarbon feed stock through said first quench chamber at a contact time of 0.001–0.1 second to pyrolyze the same to produce a secondary pyrolysis effluent containing unsaturated hydrocarbons and cool the heated portion of said first quench chamber packing, rapidly cooling said secondary pyrolysis effluent below pyrolysis temperature, mixing the effluents from said quench chambers, further cooling the mixed effluents to preclude undesirable side reactions, separating the mixed effluents into a hydrogen fraction, a mixed hydrocarbon fraction, and a water fraction, and recycling the hydrogen fraction to the hydrogen combustion step, continuing to pass primary pyrolysis effluent into said second quench chamber and secondary hydrocarbon feed into said first quench chamber until the interface between heated and cool portions of refractory packing in said second quench chamber has reached a point where the cool portion of packing is at about minimum efficiency for quenching pyrolysis effluent and the hot portion is at substantially the temperature of the primary pyrolysis effluent, and the heated portion of said first quench chamber packing has been cooled to substantially the temperature of the secondary hydrocarbon feed, then transferring flow of primary pyrolysis effluent to said first quench chamber for continuing rapid quenching and flow of said secondary hydrocarbon feed to said second quench chamber for continuing pyrolysis, and thereafter repeating the cycle.

3. A process in accordance with claim 2 in which the tempering of said hot flue gas is effected by admixing suitable amounts of low pressure steam.

4. A process in accordance with claim 2 in which the tempering of said hot flue gas is effected by indirect heat exchange with a fluid selected from the group of water, steam, said primary feed, and liquid hydrocarbons.

5. A process in accordance with claim 2 in which said primary and said secondary feeds have substantially the same composition.

6. A process in accordance with claim 2 in which the quenching of the secondary reaction effluent is initially effected in the residual cold section of said first quenching zone, and thereafter, when said residual cold section is eliminated, by commingling said secondary effluent with the quenched, primary reaction effluent.

7. A process in accordance with claim 6 in which said secondary hydrocarbon feed stock consists essentially of ethane.

8. A process in accordance with claim 4 in which said feeds are introduced at a temperature of about 300° F.

9. In the non-catalytic high temperature continuous gas pyrolysis of a hydrocarbon feed stock consisting essentially of ethane to produce unsaturated hydrocarbons and hydrogen, a reaction cycle which comprises continuously burning recycled hydrogen with oxygen to provide an oxygen-free flue gas consisting essentially of superheated steam, tempering said steam to a temperature of about 2500°–3000° F. by mixing low temperature steam therewith, continuously mixing said hydrocarbon feed stock with said steam in a reaction zone comprising a mass of granular heat exchange material at 2000°–3000° F. to produce a pyrolysis effluent containing unsaturated hydrocarbons and hydrogen, passing said pyrolysis effluent into a first quenching chamber packed with a relatively cool mass of granular refractory heat transfer material, the rate of flow of reactants and rate of cooling in said quench chamber being such that the hydrocarbon feed stock is maintained at pyrolysis temperature for about 0.001–0.1 second, terminating the flow of pyrolysis effluent through said quench chamber when the interface between hot and cool portions of the refractory packing has reached a point where the remaining cool portion of the packing is at about minimum efficiency for quenching the pyrolysis effluent, transferring the flow of pyrolysis effluent through a second quench chamber packed with a relatively cool mass of granular refractory heat transfer material to quench said effluent at the same rate as in said first chamber, and simultaneously therewith passing a cool secondary hydrocarbon feed stock consisting essentially of ethane through said first quench chamber at a contact time of 0.001–0.1 second to pyrolyze the same to produce a secondary pyrolysis effluent containing unsaturated hydrocarbons and cool the heated portion of said first quench chamber packing, rapidly cooling said secondary pyrolysis effluent below pyrolysis temperature, mixing the effluents from said quench chamber, further cooling the mixed effluents to preclude undesirable side reactions, separating the mixed effluents into a hydrogen fraction, a mixed hydrocarbon fraction, and a water fraction, and recycling the hydrogen fraction to the hydrogen combustion step, continuing to pass primary pyrolysis effluent into said second quench chamber and secondary hydrocarbon feed into said first quench chamber until the interface between heated and cool portions of refractory packing in said second quench chamber reaches a point where the cool portion of packing is at about minimum efficiency for quenching pyrolysis effluent and the hot portion is at substantially the temperature of the primary pyrolysis effluent, and the heated portion of said first quench chamber packing has been cooled to substantially the temperature of the secondary hydrocarbon feed, then transferring flow of primary pyrolysis effluent to said first quench chamber for continuing rapid quenching and flow of said secondary hydrocarbon feed to said second quench chamber for continuing pyrolysis, and thereafter repeating the cycle.

References Cited in the file of this patent

UNITED STATES PATENTS

| | | |
|---|---|---|
| 2,363,716 | Wolk | Nov. 28, 1944 |
| 2,608,594 | Robinson | Aug. 26, 1952 |
| 2,692,819 | Hasche et al. | Oct. 26, 1954 |